United States Patent
Van Tol

(10) Patent No.: US 6,628,775 B1
(45) Date of Patent: *Sep. 30, 2003

(54) SYSTEM FOR COUPLING THE PUBLIC TELEPHONE NETWORK TO THE INTERNET

(75) Inventor: Alphonsus Johannes Van Tol, Za Alphen A/D Rijn (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/647,083
(22) PCT Filed: Apr. 29, 1999
(86) PCT No.: PCT/NL99/00260
§ 371 (c)(1), (2), (4) Date: Sep. 26, 2000
(87) PCT Pub. No.: WO99/57873
PCT Pub. Date: Nov. 11, 1999

(30) Foreign Application Priority Data

May 6, 1998 (NL) .............................................. 1009083

(51) Int. Cl.[7] .............................................. H04M 7/00
(52) U.S. Cl. ........................... 379/221.02; 379/201.05; 370/238; 705/10
(58) Field of Search ........................... 379/219, 220.01, 379/221.01, 221.02, 201.01, 221.05; 370/238; 705/10

(56) References Cited

U.S. PATENT DOCUMENTS

| | | | | |
|---|---|---|---|---|
| 5,862,339 A | * | 1/1999 | Bonnaure et al. ...... | 395/200.57 |
| 6,170,017 B1 | * | 1/2001 | Dias et al. ................... | 709/235 |
| 6,236,991 B1 | * | 5/2001 | Frauenhofer et al. .......... | 707/6 |
| 6,240,462 B1 | * | 5/2001 | Agraharam et al. ......... | 709/238 |
| 6,304,902 B1 | * | 10/2001 | Black et al. ................. | 709/223 |
| 6,412,004 B1 | * | 6/2002 | Chen et al. .................. | 709/226 |

* cited by examiner

Primary Examiner—William J. Deane, Jr.
(74) Attorney, Agent, or Firm—Michaelson & Wallace; Peter L. Michaelson; Janet M. Skafar

(57) ABSTRACT

System for coupling the public telephone network to the Internet using a number of Points-of-Presence, or PoPs, arranged between the public telephone network, or Public Switched Telephony Network PSTN, and an Internet Service Provider, or ISP. There, a PoP is executed such, that it can switch a received signal through to more than one ISP. To that end, the PoP comprises a system that can be chosen from the public telephone network by various numbers, in which the chosen number determines which ISP is contacted. The invention also relates to a PoP for applying the system described above, said PoP being executed such, that it can be switch a received signal through to more than one ISP.

8 Claims, 1 Drawing Sheet

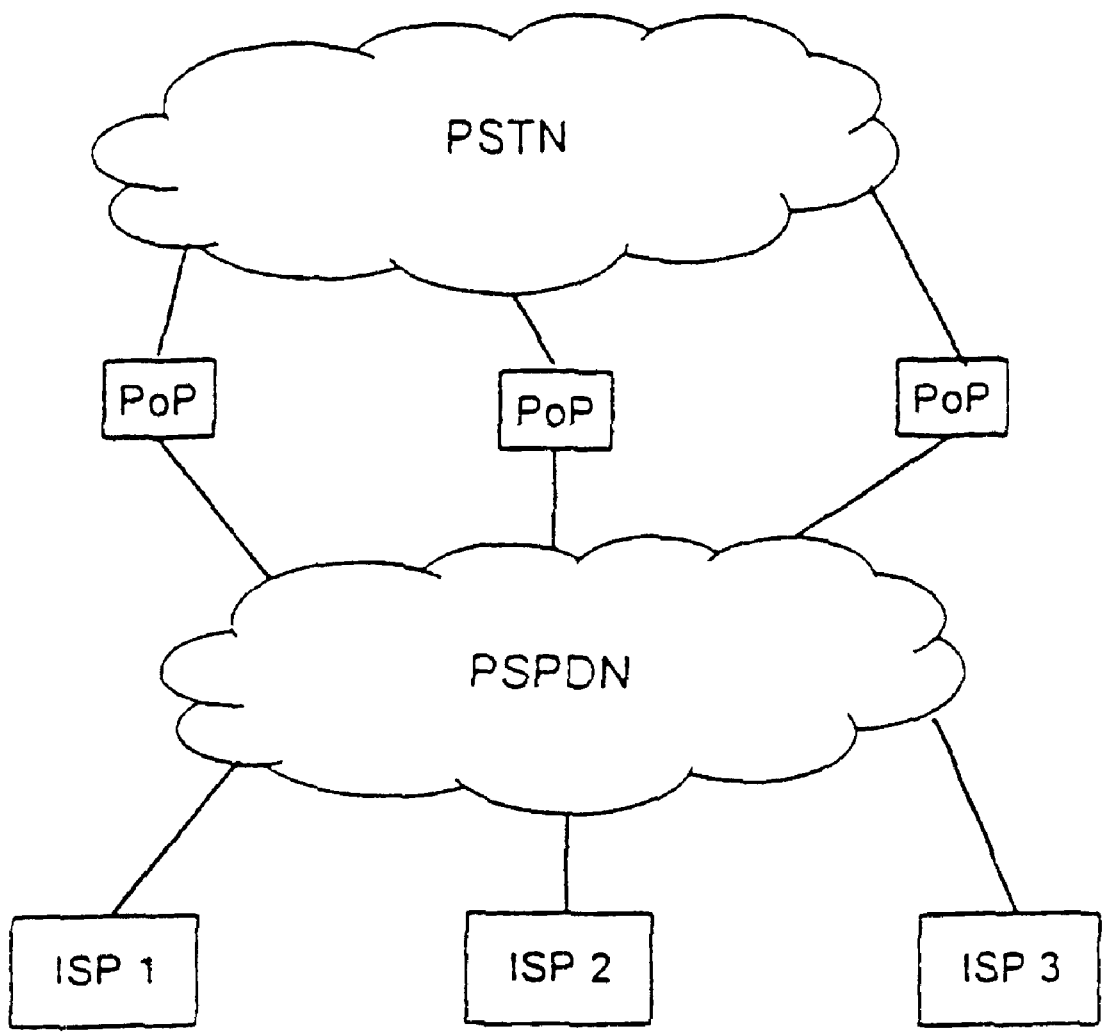

SYSTEM FOR COUPLING THE PUBLIC TELEPHONE NETWORK TO THE INTERNET

The invention relates to a system for coupling the public telephone network to the Internet using a number of Points-of-Presence, or PoPs, arranged between the public telephone network, or Public Switched Telephony Network PSTN, and an Internet Service Provider, or ISP.

Access to the Internet is permitted by Internet Service Providers. With the present system of coupling to the Internet, each ISP has a number of arranged PoPs.

Through the public telephone network, indicated as PSTN, an Internet user establishes a connection with a POP of the desired ISP. Then, from the PoP the traffic is routed to the ISP concerned through a fixed connection.

When the routing is applied as described in the non-prepublished dutch patent application NL-1008259, one PoP per traffic exchange area for each ISP will suffice. Furthermore, then directly at the source it will already be known that it concerns Internet traffic.

Necessarily, the ISP must provide for a covering network of PoPs and further rent fast connections between them and its central server. This is a relatively expensive matter, particularly for smaller ISPs.

The object of the invention is to remove this difficulty and to that end provides for, that a POP is executed such, that it can switch a received signal through to more than one ISP.

This means that a number of ISPs can use one single switching PoP, in which such a PoP itself will allot the traffic to the various ISPs. Thus, the number of PoPs can be considerably reduced. Such a switching PoP can be applied for all or a number of ISPs for providing the routing to it. There, the required conversion of circuit-switched into packet-switched can be under the responsibility of an Internet Access Operator to be established.

The switching PoP will comprise a system that can be chosen from the public telephone network by various numbers, in which the selected number determines which ISP is contacted. If the network operator of the PSTN has chosen a routing as described in the previously stated dutch patent application NL-1008259, then the chosen number will consist of a so-called prefix, indicating that it concerns an Internet call, and a serial number being unique per ISP.

The PoP assigns a free modem from the modem bank to the call and establishes the connection with the Internet server. Now the Internet server assigns an IP address to the caller based on the selected telephone number. With that, it is fixed which ISP the caller will be connected to.

The nature of the connection between PSTN and PoP also depends on the regulations in force. If the PoP is considered as a subscriber connection, then this should be a ISDN connection having DSS1-signalling. DSS1 is understood to mean Digital Subscriber Signalling. If, on the other hand, the PoPs are considered as another network, then the connection should take place in the way standard networks of other operators are connected, as e.g. according to Q.767 or Q.763.

The outgoing router of a PoP will be connected to a Frame Relay or other packet-switched data network by at least a 2 Mb link. Communication with the central servers of the several ISPs will then take place through said Frame Relay network. The switching PoP will provide for establishing a data connection with the desired ISP depending on the selected number. A PoP manager can be added to the PoPs described. This is a PC directly adjacent the PoP or at a distance from it, controlling a number of PoPs and performing the following functions:

a) configuration management: management of the tables for conversion of telephone numbers into IP addresses;

b) error management: indicating and recording errors in the connections to the PSTN and to the ISPS;

c) performance management: monitoring the load of the PoPs for timely enhancement of the capacity; and d) accounting management: recording the use of the PoP itemized per ISP in order to be able to charge the costs in proportion.

The invention is further explained by way of a diagram illustrated in the accompanying FIGURE.

Therein, PSTN—Public Switched Telephone Network—stands for the public telephone network, PoP stands for a number of Points-of-Presence, PSPDN stands for Public Switched Packet Data Network and ISP 1, 2, 3 indicate some Internet Service Providers.

As illustrated in the diagram, each PoP has been arranged such that it can lead a signal received from the PSTN to the various ISPs, so not, as is the case up to now, to only one single ISP.

Obviously, the invention also relates to a PoP capable of switching a received signal on to more than one ISP.

It will be obvious, that only one possible embodiment of a system according to the invention has been illustrated in the drawing and described above and that many changes can be made without leaving the inventive idea, as it is indicated in the accompanying claims.

What is claimed is:

1. System for coupling a public telephone network to the Internet using a number of Points-of-Presence, or PoPs, arranged between the public telephone network, and an Internet Service Provider, hereafter ISP, a PoP including means for being dialled from the public telephone network, wherein the means for being dialled from the public telephone network have been arranged for being dialled by various telephone numbers, each of which determines an ISP, and wherein a Pop further includes both means for switching through received signals to more than one ISP and means for determining a particular ISP based on the dialled telephone number.

2. The system according to claim 1, characterised in that each of the various telephone numbers includes a prefix indicating an Internet call and a serial number being unique per ISP.

3. The system according to claim 2, characterised in that the packet-switched data network is a public switched packet data network (PSPDN).

4. The system according to claim 1, further comprising a PoP manager for controlling a number of PoPs.

5. The system according to claim 1, characterised in that the packet-switched data network is a public switched packet data network (PSPDN).

6. The system according to claim 2, characterised in that the system comprises a PoP manager for controlling a number of PoP's.

7. The system according to claim 2, further comprising a PoP manager for controlling a number of PoPs.

8. The system according to claim 3, further comprising a PoP manager for controlling a number of PoPs.

\* \* \* \* \*